US011802592B2

(12) United States Patent
Rönblom

(10) Patent No.: US 11,802,592 B2
(45) Date of Patent: Oct. 31, 2023

(54) JOINT ASSEMBLY CAPABLE OF CONSTANT ROTATIONAL SPEED AND A POWER TOOL COMPRISING THE SAME

(71) Applicant: ATLAS COPCO INDUSTRIAL TECHNIQUE AB, Stockholm (SE)

(72) Inventor: Johan Rönblom, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 423 days.

(21) Appl. No.: 17/044,277

(22) PCT Filed: Apr. 2, 2019

(86) PCT No.: PCT/EP2019/058277
§ 371 (c)(1),
(2) Date: Sep. 30, 2020

(87) PCT Pub. No.: WO2010/201589
PCT Pub. Date: Oct. 24, 2019

(65) Prior Publication Data
US 2021/0148412 A1 May 20, 2021

(30) Foreign Application Priority Data

Apr. 19, 2018 (SE) .................................... 1830132-5

(51) Int. Cl.
*F16D 3/223* (2011.01)
*B25B 23/14* (2006.01)
(Continued)

(52) U.S. Cl.
CPC .............. *F16D 3/223* (2013.01); *B25B 23/14* (2013.01); *B25B 21/00* (2013.01);
(Continued)

(58) Field of Classification Search
CPC ........... F16D 3/223; F16D 2003/22303; F16D 2003/22309; F16D 2003/22326;
(Continued)

(56) References Cited

U.S. PATENT DOCUMENTS 3,710,874 A * 1/1973 Seccombe ............. B25B 23/147
173/182
7,647,807 B2   1/2010 Hansson
(Continued)

FOREIGN PATENT DOCUMENTS

EP   2431714 A1   3/2012
JP   2006097758 A  4/2006
(Continued)

OTHER PUBLICATIONS

Universal Joint and Driveshaft Design Manual, AE-7, Society of Automotive Engineers, Inc., Warrendale, PA, Chapters 3.2.1. and 3.2.8., TJ1079.S62. (Year: 1979).*
(Continued)

*Primary Examiner* — Greg Binda
(74) *Attorney, Agent, or Firm* — Holtz, Holtz & Volek PC

(57) ABSTRACT

A constant-velocity joint assembly for a power tool includes an output shaft and a coupling structure configured to drive the output shaft. The output shaft and the coupling structure form a joint configured to enable angling of the output shaft relative to the coupling structure at constant rotational speed, and the coupling structure is provided with a torque transducer configured to detect a torque acting on the coupling structure provided by the output shaft.

12 Claims, 3 Drawing Sheets

(51) Int. Cl.
  *B25B 21/00* (2006.01)
  *G01L 3/10* (2006.01)
(52) U.S. Cl.
  CPC .............. *F16D 2003/22303* (2013.01); *F16D 2003/22309* (2013.01); *F16D 2003/22326* (2013.01); *F16D 2300/18* (2013.01); *G01L 3/108* (2013.01)
(58) Field of Classification Search
  CPC ..... F16D 2300/18; B25B 23/14; B25B 21/00; G01L 3/108
  USPC ................................... 173/182; 464/23, 140
  See application file for complete search history.

(56) References Cited

U.S. PATENT DOCUMENTS

| | | |
|---|---|---|
| 2016/0313198 A1 | 10/2016 | Elsmark et al. |
| 2016/0318165 A1 | 11/2016 | Thorson et al. |

FOREIGN PATENT DOCUMENTS

| | | |
|---|---|---|
| JP | 2016109201 A | 6/2016 |
| WO | 2017155446 A1 | 9/2017 |

OTHER PUBLICATIONS

International Search Report (ISR) dated Jul. 8, 2019 issued in International Application No. PCT/EP2019/058277.

Written Opinion dated Jul. 8, 2019 issued in International Application No. PCT/EP2019/058277.

International Preliminary Report on Patentability (IPRP) dated Mar. 24, 2020 issued in International Application No. PCT/EP2019/058277.

Japanese Office Action (and an English language translation thereof) dated May 9, 2023, issued in counterpart Japanese Application No. 2020-557312.

* cited by examiner

JOINT ASSEMBLY CAPABLE OF CONSTANT ROTATIONAL SPEED AND A POWER TOOL COMPRISING THE SAME

TECHNICAL FIELD

The present disclosure generally relates to power tools.

BACKGROUND

In applications which require high power density, such as in industrial assembly, advanced motor control is usually required. In order to be able to control the motor of a power tool such as a nutrunner exactly, the torque is generally measured and fed to the motor controller. A torque sensor may be used for measuring the torque.

An example of power tools used in industrial assembly, in particular nutrunners, provided with a torque sensor is disclosed in AMT's "product catalog H 1", revision 04/2015 entitled "High Power Nutrunning Equipment". This document discloses, amongst other tools an angle nutrunner for which the torque is captured directly at the output shaft from the angular drive.

One drawback with the solution disclosed in the above-indicated document is that the length of the angle head is extended because the torque sensor is fitted in the angle head and requires extra length. Moreover, there is a risk that torque measurements are contaminated due to external influence when the nutrunner is being used.

SUMMARY

In use, the square drive of a nutrunner may be subjected to bending forces, in particular because the user may exert force onto the tool to maintain it in the correct position. This bending of the square drive results in bending forces acting on the torque sensor, which influences the torque measurements provided by the torque sensor.

In view of the above, an object of the present disclosure is to provide a joint assembly capable of constant rotational speed and a power tool comprising such a joint assembly which solve, or at least mitigate, the problems of the prior art.

There is hence according to a first aspect of the present disclosure provided a joint assembly comprising: an output shaft, and a coupling structure configured to drive the output shaft, wherein the output shaft and the coupling structure form a first joint configured to enable angling of the output shaft relative to the coupling structure at constant rotational speed, wherein the coupling structure is provided with a torque transducer configured to detect a torque acting on the coupling structure provided by the output shaft.

The coupling structure and thus the torque transducer are decoupled from the output shaft in the sense that bending forces acting on the output shaft will not be transmitted to the coupling structure and the torque transducer, or at least they will be reduced. This effect is obtained due to the first joint which enables angling, in particular a variable angle, of the output shaft relative to the coupling structure at constant rotational speed. As a result, more accurate torque measurements may be provided.

The output shaft and the coupling structure are arranged coaxially in a default non-rotating state and the angling of the output shaft relative to the coupling structure is with respect to the common central rotational axis.

The output shaft may for example be a square drive.

According to one embodiment the joint assembly is for a power tool. The joint assembly may for example be designed for an angle head of a handheld power tool.

According to one embodiment the torque transducer comprises strain gauge elements.

According to one embodiment the torque transducer is provided on an external peripheral surface of the coupling structure. This simplifies the mounting of the strain gauge elements onto the coupling structure.

The coupling structure may have a hollow cylindrical body provided with a central channel. As an alternative to providing the strain gauge elements on the external peripheral surface of the coupling structure, the strain gauge elements could be provided on the inner surface of the central channel.

One embodiment comprises a power and signal transmission device having a fixed part and a rotatable part configured to interact with the fixed part, wherein the coupling structure has a central channel and the rotatable part is fixedly attached to the coupling structure in the central channel and connected to the torque transducer, and wherein the fixed part is provided in the central channel detached from the coupling structure, whereby the rotatable part is able to rotate relative to the fixed part. The rotatable torque transducer may thus be fed with power and the torque measurement signals from the torque transducer may be transmitted for further processing.

According to one embodiment the power and signal transmission device is a slip ring.

One embodiment comprises a crown wheel, wherein the coupling structure and the crown wheel form an integral component.

One embodiment comprises a crown wheel, wherein the coupling structure is configured to provide a drive connection between the crown wheel and the output shaft.

According to one embodiment the crown wheel and the coupling structure form a second joint configured to enable angling of the crown wheel relative to the coupling structure at a constant rotational speed, wherein the torque transducer is configured to detect a torque acting on the coupling structure provided by the output shaft and the crown wheel.

The crown wheel and the coupling structure are arranged coaxially in a default non-rotating state and the angling of the crown wheel relative to the coupling structure is with respect to the common central rotational axis.

In addition to the bending of the output shaft, the crown wheel may also be subjected to bending as it cooperates with a pinion which drives the crown wheel. The coupling structure and thus the torque transducer are decoupled from the crown wheel in the sense that bending forces acting on the crown wheel will not be transmitted to the coupling structure and the torque transducer, or at least they will be reduced. This effect is obtained due to the second joint which enables angling, in particular a variable angle, of the crown wheel relative to the coupling structure at constant rotational speed. As a result, more accurate torque measurements may be provided.

In addition, this double-joint configuration is compact and may reduce the footprint or axial length of a power tool comprising the joint.

One embodiment comprises a first set of bearing balls configured to enable the angling of the crown wheel relative to the coupling structure and a second set of bearing balls configured to enable angling of the output shaft relative to the coupling structure.

According to one embodiment the coupling structure has a first end provided with a first set of cup grooves receiving a respective one of the first set of bearing balls and a second end provided with a second set of cup grooves receiving a respective one of the second set of bearing balls.

According to one embodiment the output shaft has a central output shaft channel provided with a third set of cup grooves receiving a respective one of the second set of bearing balls, and wherein the crown wheel has a central crown wheel channel provided with a fourth set of cup grooves receiving a respective one of the first set of bearing balls.

According to one embodiment the coupling structure has a first end and a second end opposite to the first end portion, wherein the crown wheel is configured to receive the first end and the output shaft is configured to receive the second end.

According to one embodiment the bearing balls may have the same size as those bearing balls which are used for enabling rotation of the output shaft and crown wheel relative to the power tool housing, facilitating the assembly process of the power tool since fewer types of different components are necessary for assembly.

There is according to a second aspect of the present disclosure provided a power tool comprising a joint assembly according to the first aspect.

The power tool may for example be a nutrunner such as an angle nutrunner or a straight nutrunner.

One embodiment comprises a planetary gear system and an auxiliary torque transducer configured to mechanically interact with the planetary gear system to provide an auxiliary torque measurement. The power tool may be configured to compare the torque measurement from the torque transducer with the auxiliary torque measurement to determine whether the two measured torques are equal or deviate within a predetermined allowable range or if they deviate more. The latter situation provides an indication that the power tool may need to be serviced.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
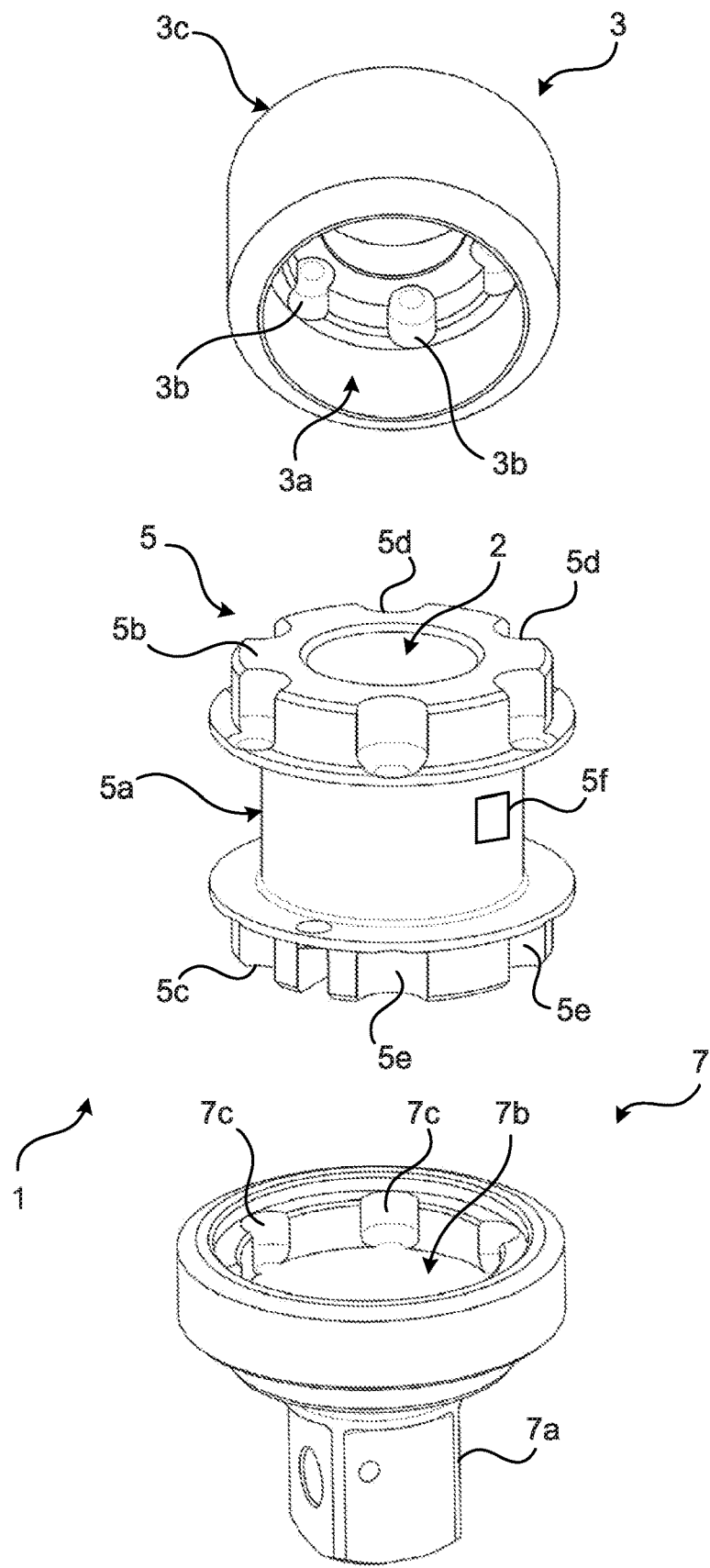
FIG. 1 schematically depicts a perspective view of an example of a disassembled joint assembly.

FIG. 1 depicts an example of a joint assembly 1. The joint assembly 1 is configured to be used in a power tool. The exemplified joint assembly 1 comprises a crown wheel 3, a coupling structure 5 and an output shaft 7.

In the example shown in FIG. 1, the crown wheel 3 and the coupling structure 5 are separate components. According to one alternative design, the crown wheel and the coupling structure may form a single integral component. To this end, the crown wheel may comprise the coupling structure.

According to the example in FIG. 1, the crown wheel 3 is configured to drive the coupling structure 5. The coupling structure 5 is configured to drive the output shaft 7. Hereto, rotation of the crown wheel 3 results in rotation of the output shaft 7.

The coupling structure 5 and the output shaft 7 define a first joint enabling angling of the output shaft 7 relative to the coupling structure 5 at constant rotational speed. The coupling structure 5 and the crown wheel 3 define a second joint enabling angling of the crown wheel 3 relative to the coupling structure 5 at constant rotational speed.

The coupling structure 5 has a hollow cylindrical body, or shaft, 5a in which a central channel 2 is provided. The coupling structure 5 has a first end 5b and a second end 5c. The first end 5b is provided with a first set of cup grooves 5d. The first set of cup grooves 5d comprises a plurality of cup grooves 5d distributed along the first end 5b in the circumferential direction of the coupling structure 5. The second end 5c is provided with a second set of cup grooves 5e. The second set of cup grooves 5e comprises a plurality of cup grooves 5e distributed along the second end 5c in the circumferential direction of the coupling structure 5.

The output shaft 7, which may be a square drive, has a tool end 7a and a central output shaft channel 7b opening from an opposite end relative to the tool end 7a. The output shaft 7 is configured to receive the second end 5c of the coupling structure 5 in the central output shaft channel 7b coaxially. The inner surface of the central output shaft channel 7b is provided with a third set of cup grooves 7c distributed in the circumferential direction of the output shaft 7. The third set of cup grooves 7c includes a plurality of cup grooves 7c.

The crown wheel 3 has a gear end 3c provided with teeth and a central crown wheel channel 3a opening from an opposite end relative to the gear end 3. The crown wheel 3 is configured to receive the first end 5b of the coupling structure 5 in the central crown wheel channel 3a coaxially. The inner surface of the central crown wheel channel 3a is provided with a fourth set of cup grooves 3b distributed in the circumferential direction of the crown wheel 3. The fourth set of cup grooves 3b includes a plurality of cup grooves 3b. By designing the coupling structure 5 with an axial dimension such that the crown wheel 3 and the output shaft 7 receive the majority of the length of the coupling structure 5, such as at least 80%, for example at least 85% such as at least 90% or at least 95% of the length of the coupling structure 5, the lengthwise impact on the joint assembly 1 caused by the coupling structure 5 may be kept minimal. The axial length of the joint assembly 1 may hence be minimised.

Figure 3:
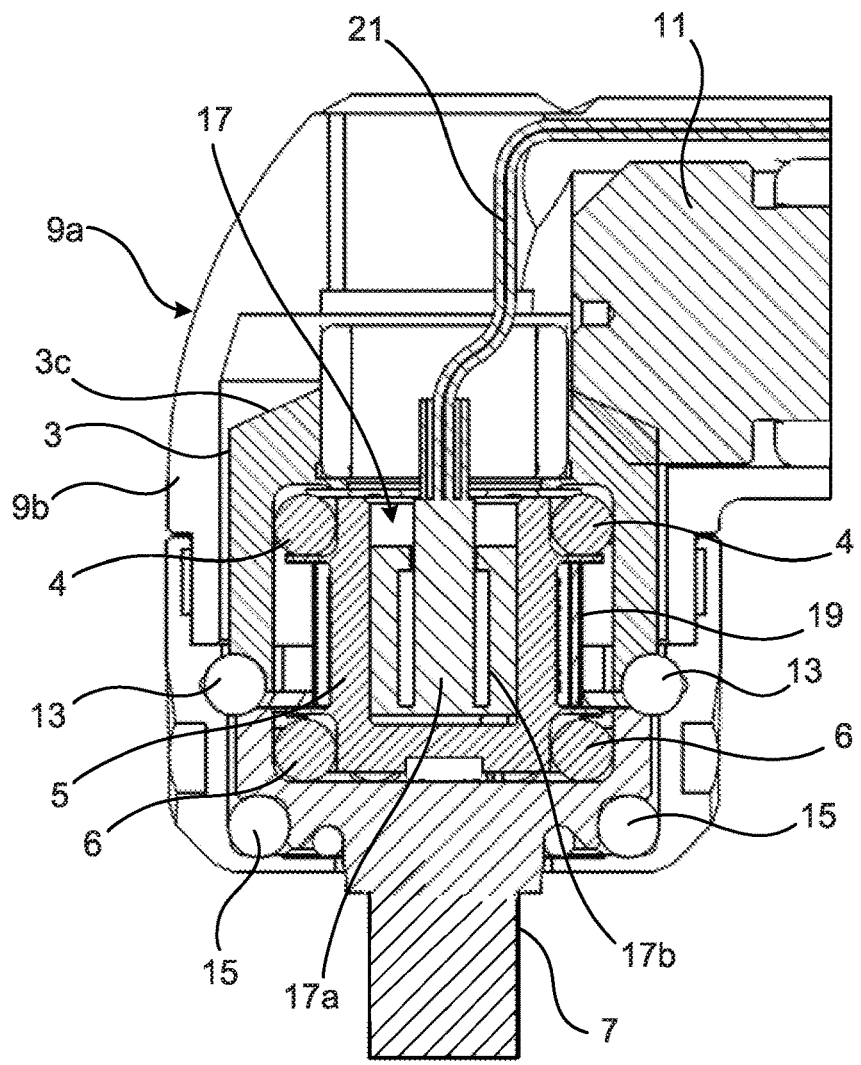
FIG. 3 schematically shows a longitudinal section of an angle head of the power tool in FIG. 2.

The joint assembly 1 comprises a first set of bearing balls 4 (shown in FIG. 3) and a second set of bearing balls 6 (shown in FIG. 3). The bearing balls 4 of the first set of bearing balls are received by a respective cup groove 5d of the first set of cup grooves and cup groove 3b of the fourth set of cup grooves. This configuration rotationally locks the crown wheel 3 and the coupling structure 5 and allows angling of the crown wheel 3 relative to the coupling structure 5 while the crown wheel 3 drives the coupling structure without providing a bending force onto the coupling structure 5.

The bearing balls 6 of the second set of bearing balls are received by a respective cup groove 5e of the second set of cup grooves and cup groove 7c of the third set of cup grooves. This configuration rotationally locks the coupling structure 5 and the output shaft 7 and allows angling of the output shaft 7 relative to the coupling structure 5 while the coupling structure 5 drives the output shaft 7 without providing a bending force onto the coupling structure 5.

The coupling structure 5 furthermore comprises a torque transducer 5f. According to the present example, the torque transducer comprises strain gauge elements 5f. The strain gauge elements 5f are provided on the external peripheral surface of the coupling structure 5, in particular of the cylindrical body 5a. The torque transducer 5f is configured to measure torque to which the coupling structure 5 is being subjected to due to stress on the coupling structure 5 applied by the output shaft 7 and the crown wheel 3.

Figure 2:
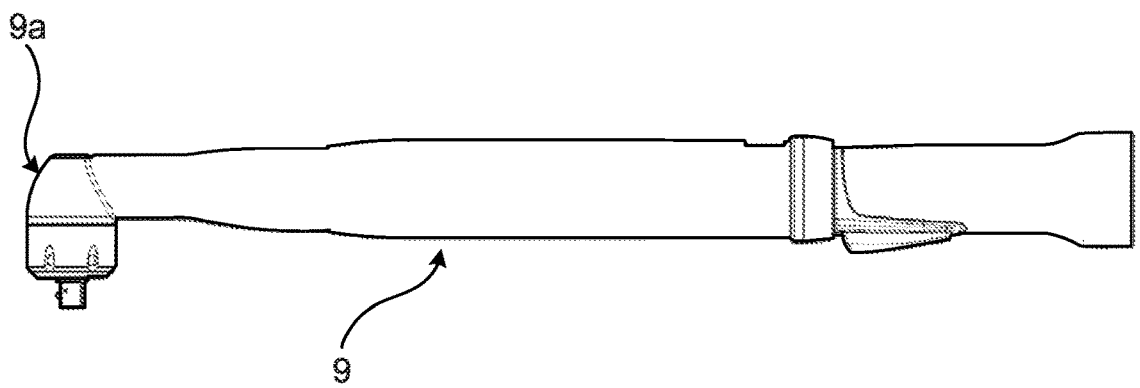
FIG. 2 schematically shows a side view of an example of a power tool.

FIG. 2 shows an example of a power tool 9 comprising the joint assembly 1. The power tool 9 has an angle head 9a and the joint assembly 1 is provided in the angle head 9a.

The power tool 9 is a handheld power tool. In the present example, the power tool 9 is a nutrunner, although it is envisaged that other power tools could also be provided with the joint assembly 1.

FIG. 3 shows a longitudinal section of the angle head 9a. The power tool 9 comprises an electric motor (not shown), a planetary gear system and a pinion 11 configured to be driven by the electric motor via the planetary gear system. The pinion 11 is configured to engage with the gear end 3c of the crown wheel 3 to thereby drive the crown wheel 3. The crown wheel 3 is rotationally locked with the coupling structure 5 and the coupling structure 5 is rotationally locked with the output shaft 7. Rotation of the pinion 11 hence causes rotation of the output shaft 7 via the crown wheel 3 and the coupling structure 5. The joint assembly 1 is hence able to rotate freely inside the power tool housing 9b. The power tool 9 may to this end comprise a third set of bearing balls 13 and a fourth set of bearing balls 15 configured to enable the rotation of the crown wheel 3 and of the output shaft 7 relative to the power tool housing 9b.

The joint assembly 1 further comprises a power and signal transmission device 17. The power and signal transmission device 17 is configured to power the torque transducer 5f and to relay torque measurement signals from the torque transducer 5f. The exemplified power and signal transmission device 17 comprises a fixed part 17a and a rotatable part 17b. The fixed part 17a is arranged stationary with respect to the crown wheel 3, the coupling structure 5 and the output shaft 7. The fixed part 17a is arranged in the central channel 2 of the coupling structure 5. The rotatable part 17b is configured to be rotatable relative to the fixed part 17a. The rotatable part 17b is fixedly mounted to the coupling structure 5 inside the central channel 2. The rotatable part 17b is hence configured to rotate concurrently with the coupling structure 5. The fixed part 17a is received by the rotatable part 17b enabling interaction between the fixed part 17a and the rotatable 17b to thereby provide power to and transmit torque measurement signals from the torque transducer 5f.

In the example in FIG. 3, the power and signal transmission device 17 is a slip ring. One of the rotatable part 17b and the fixed part 17a hence includes contact members such as brushes, in sliding mechanical connection with the other one of the rotatable part 17b and the fixed part 17a. The rotatable part 17b is connected with power wires and signal wires to the torque transducer 5f. Alternatively, the power and signal transmission device could be configured to provide contactless power transmission and signal transmission between the fixed part and the rotatable part, for example by means of wireless telemetry or a rotary transformer.

The joint assembly 1 may comprise an amplifier circuit 19. The amplifier circuit 19 may be fixedly mounted to the coupling structure 5. The amplifier circuit 19 may be connected to the torque transducer 5f and to the rotatable part 17b. The amplifier circuit 19 is configured to amplify torque measurement signals generated by the torque transducer 5f. In this manner, the torque measurement signals are amplified before they are received by the fixed part 17a. The impact of any voltage ripple on the torque measurement signal that could make processing of the torque measurement signal more difficult will thereby be reduced in view of the total torque measurement signal strength.

The power tool 9 comprises electric wiring 21 and electronics such as a motor controller and a power unit (not shown). The electric wiring 21 is connected to the power and signal transmission device 17, in particular to the fixed part 17a and to the electronics to power the torque transducer and to transmit torque measurement signals for processing and motor control.

Figure 4:
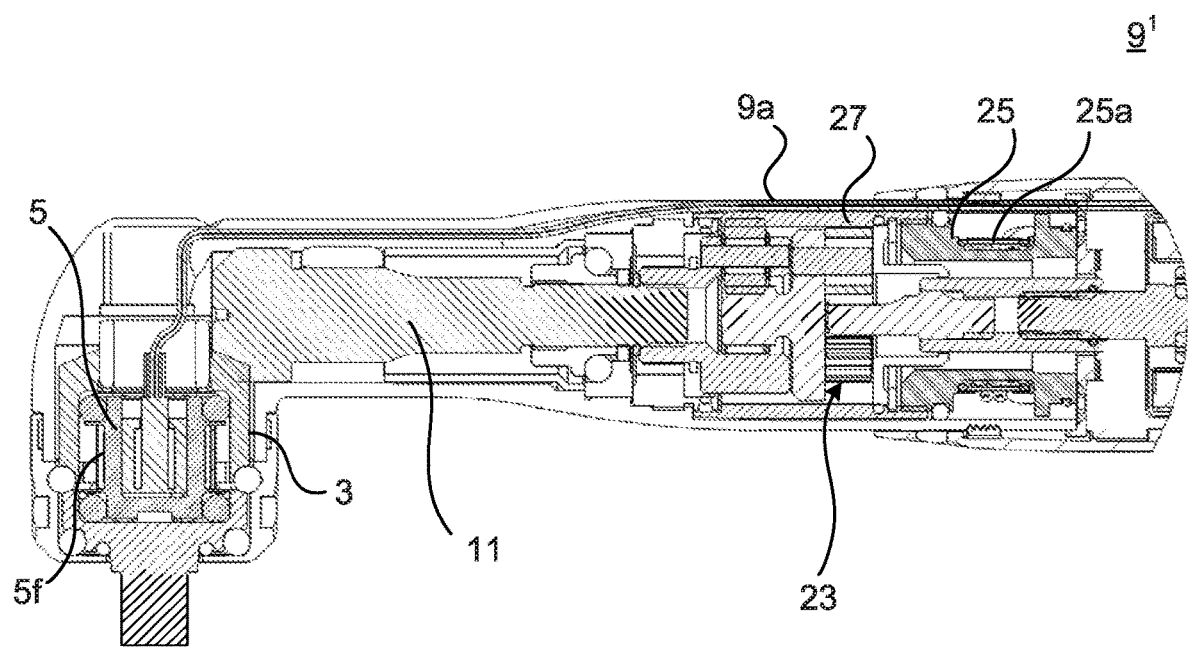
FIG. 4 schematically shows a longitudinal section of a portion of another example of a power tool.

FIG. 4 shows another example of a power tool 9', which comprises the joint assembly 1 as described above. The power tool 9' comprises a planetary gear system 23 configured to cooperate with the rotor of the electric motor, and in addition to the torque transducer 5f, an auxiliary torque transducer 25. The auxiliary torque transducer 25 is cylindrical and has a free end in the axial direction and a fixed end opposite to the free end. The auxiliary torque transducer 25 may for example comprise strain gauge elements 25a. The power tool 9' furthermore comprises a cylindrical torque transmitting element 27 enveloping the planetary gear system 23. The torque transmitting element 27 connects the free end of the auxiliary torque transducer 25 and the planetary gear system 23. The torque transmitting element 27 is configured to rotationally engage with the auxiliary torque transducer 25 and to cooperate with the planetary gear system 23 to thereby transmit torque to the auxiliary torque transducer 25 which due to its fixed end is arranged in a substantially non-rotatable manner with respect to the power tool housing 9a. The auxiliary torque transducer 25 hence provides an auxiliary torque measurement.

The auxiliary torque measurement will with the aging of the power tool 9', e.g. due to the wear of the coupling between the pinion 11 and the crown wheel 3 diverge from the torque measurement provided by the torque transducer 5f of the coupling structure 5. By comparing the auxiliary torque measurement signal from the auxiliary torque transducer 25 and the torque measurement signal from the torque transducer 5f, an indication about the need to service the power tool 9' may be provided. Hereto, the electronics of the power tool 9' may be configured to compare and analyse the auxiliary torque measurement signal and the torque measurement signal and generate service indication data to provide an indication of a service need in case the difference between the two torque measurement signals exceeds a threshold value or predetermined range.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power tool comprising:
an angle head; and
a joint assembly provided in the angle head,
wherein the joint assembly comprises:
an output shaft;
a coupling structure configured to drive the output shaft; and
a crown wheel,
wherein the output shaft and the coupling structure form a first joint configured to enable angling of the output shaft relative to the coupling structure at constant rotational speed,
wherein the coupling structure is provided with a torque transducer,
wherein the coupling structure is configured to provide a drive connection between the crown wheel and the output shaft,
wherein the crown wheel and the coupling structure form a second joint configured to enable angling of the crown wheel relative to the coupling structure, and
wherein the torque transducer is configured to detect a torque acting on the coupling structure provided by the output shaft and the crown wheel.

2. The power tool according to claim 1, wherein the torque transducer comprises strain gauge elements.

3. The power tool according to claim 1, wherein the torque transducer is provided on an external peripheral surface of the coupling structure.

4. The power tool according to claim 1, further comprising:
a power and signal transmission device having a fixed part and a rotatable part configured to interact with the fixed part,
wherein the coupling structure has a central channel and the rotatable part is fixedly attached to the coupling structure in the central channel and connected to the torque transducer, and
wherein the fixed part is provided in the central channel detached from the coupling structure, whereby the rotatable part rotatable relative to the fixed part.

5. The power tool according to claim 4, wherein the power and signal transmission device is a slip ring.

6. The power tool according to claim 1, further comprising:
a first set of bearing balls configured to enable the angling of the crown wheel relative to the coupling structure at constant rotational speed; and
a second set of bearing balls configured to enable angling of the output shaft relative to the coupling structure.

7. The power tool according to claim 6, wherein the coupling structure has a first end provided with a first set of cup grooves each receiving a respective one of the first set of bearing balls and a second end provided with a second set of cup grooves each receiving a respective one of the second set of bearing balls.

8. The power tool according to claim 7, wherein the output shaft has a central output shaft channel provided with a third set of cup grooves each receiving a respective one of the second set of bearing balls, and
wherein the crown wheel has a central crown wheel channel provided with a fourth set of cup grooves each receiving a respective one of the first set of bearing balls.

9. The power tool according to claim 1, wherein the coupling structure has a first end and a second end opposite to the first end, and
wherein the crown wheel is configured to receive the first end and the output shaft is configured to receive the second end.

10. The power tool according to claim 1, further comprising a planetary gear system and an auxiliary torque transducer configured to mechanically interact with the planetary gear system to provide an auxiliary torque measurement.

11. The power tool according to claim 1, wherein the crown wheel and the output shaft contain a majority of an axial length of the coupling structure therein.

12. The power tool according to claim 1, wherein the crown wheel and the output shaft contain at least 80% of an axial length of the coupling structure therein.

* * * * *